(12) United States Patent
Wang et al.

(10) Patent No.: US 12,292,341 B2
(45) Date of Patent: May 6, 2025

(54) HIGH VOLTAGE HARNESS THERMAL MONITOR AND POWER MANAGEMENT SYSTEM

(71) Applicants: Shu S Wang, Lake Orion, MI (US); David A Lawrence, Lake Orion, MI (US); Michael Barkey, Maidstone (CA)

(72) Inventors: Shu S Wang, Lake Orion, MI (US); David A Lawrence, Lake Orion, MI (US); Michael Barkey, Maidstone (CA)

(73) Assignee: FCA US LLC, Auburn Hills, MI (US)

( * ) Notice: Subject to any disclaimer, the term of this patent is extended or adjusted under 35 U.S.C. 154(b) by 329 days.

(21) Appl. No.: 17/893,345

(22) Filed: Aug. 23, 2022

(65) Prior Publication Data

US 2024/0068882 A1    Feb. 29, 2024

(51) Int. Cl.
*G01K 7/16* (2006.01)
*B60R 16/03* (2006.01)
*B60W 20/50* (2016.01)

(52) U.S. Cl.
CPC ............... *G01K 7/16* (2013.01); *B60R 16/03* (2013.01); *B60W 20/50* (2013.01); *B60W 2510/0676* (2013.01); *B60W 2510/068* (2013.01); *B60W 2510/087* (2013.01); *B60W 2520/10* (2013.01); *B60W 2555/20* (2020.02)

(58) Field of Classification Search
CPC .......... B60W 20/50; B60R 16/03; G01K 7/16
USPC ........................................................ 701/22
See application file for complete search history.

(56) References Cited

U.S. PATENT DOCUMENTS

| | | | |
|---|---|---|---|
| 8,112,206 B2 * | 2/2012 | Heap ..................... | B60W 10/26 477/181 |
| 8,214,120 B2 * | 7/2012 | Kothari ................. | B60K 28/14 701/84 |
| 8,556,011 B2 | 10/2013 | Anwar et al. | |

* cited by examiner

*Primary Examiner* — Todd Melton
*Assistant Examiner* — Vincent Feng
(74) *Attorney, Agent, or Firm* — Jeremy J. Klobucar

(57) ABSTRACT

A system and method of controlling a powertrain to protect a high voltage cable by determining a temperature characteristic for a busbar, determining a temperature characteristic adjacent to a component, and determining a current through the high voltage cable. Thereafter, the method reduces an operating characteristic of the powertrain based on the temperature characteristic for the busbar, the temperature characteristic adjacent to the component, and the current.

20 Claims, 18 Drawing Sheets

HIGH VOLTAGE HARNESS THERMAL MONITOR AND POWER MANAGEMENT SYSTEM

FIELD

The present disclosure relates to high voltage cables in a hybrid or electric vehicle and, in particular, to systems and methods for controlling the temperature in high voltage cables based on modifying an operating characteristic of a powertrain.

BACKGROUND

This section provides background information related to the present disclosure which is not necessarily prior art.

Hybrid and electric vehicles comprise an electrified powertrain containing high voltage (HV) cables, sometimes referred to as a high voltage harness. The high voltage cables are connected to high voltages and carry high currents that generate significant ohmic heat or a temperature associated therewith which increase the temperature of the cable. Further, ambient temperatures contribute to the heat and the temperature associated therewith in the cables in both hybrid and electric vehicles. Additional heat is generated in hybrid vehicles by the combustion engine and exhaust. When high voltage cables are exposed to heat that exceeds a thermal limit, the shielding, insulation, and connectors may weaken and reduce the life of the cables. The cable components may deteriorate and allow elements, like water, may then penetrate the cable and short the electrical system.

SUMMARY

This section provides a general summary of the disclosure, and is not a comprehensive disclosure of its full scope or all of its features.

In an example of the present disclosure, a method of controlling a powertrain to protect a high voltage cable by determining a temperature characteristic for a busbar, determining a temperature characteristic adjacent to a component, and determining a current through the high voltage cable. Thereafter, the method reduces an operating characteristic of the powertrain based on the temperature characteristic for the busbar, the temperature characteristic adjacent to the component, and the current.

In another example, a control system for controlling a powertrain to protect a high voltage cable, the control system comprising one or more high voltage cables and one or more components comprising one or more busbars. The controller configured to determine a temperature characteristic for a busbar, determine a temperature characteristic adjacent to a component, determine a current through the high voltage cable, and reduce an operating characteristic of the powertrain based on the temperature characteristic for the busbar, the temperature characteristic adjacent to the component, and the current.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
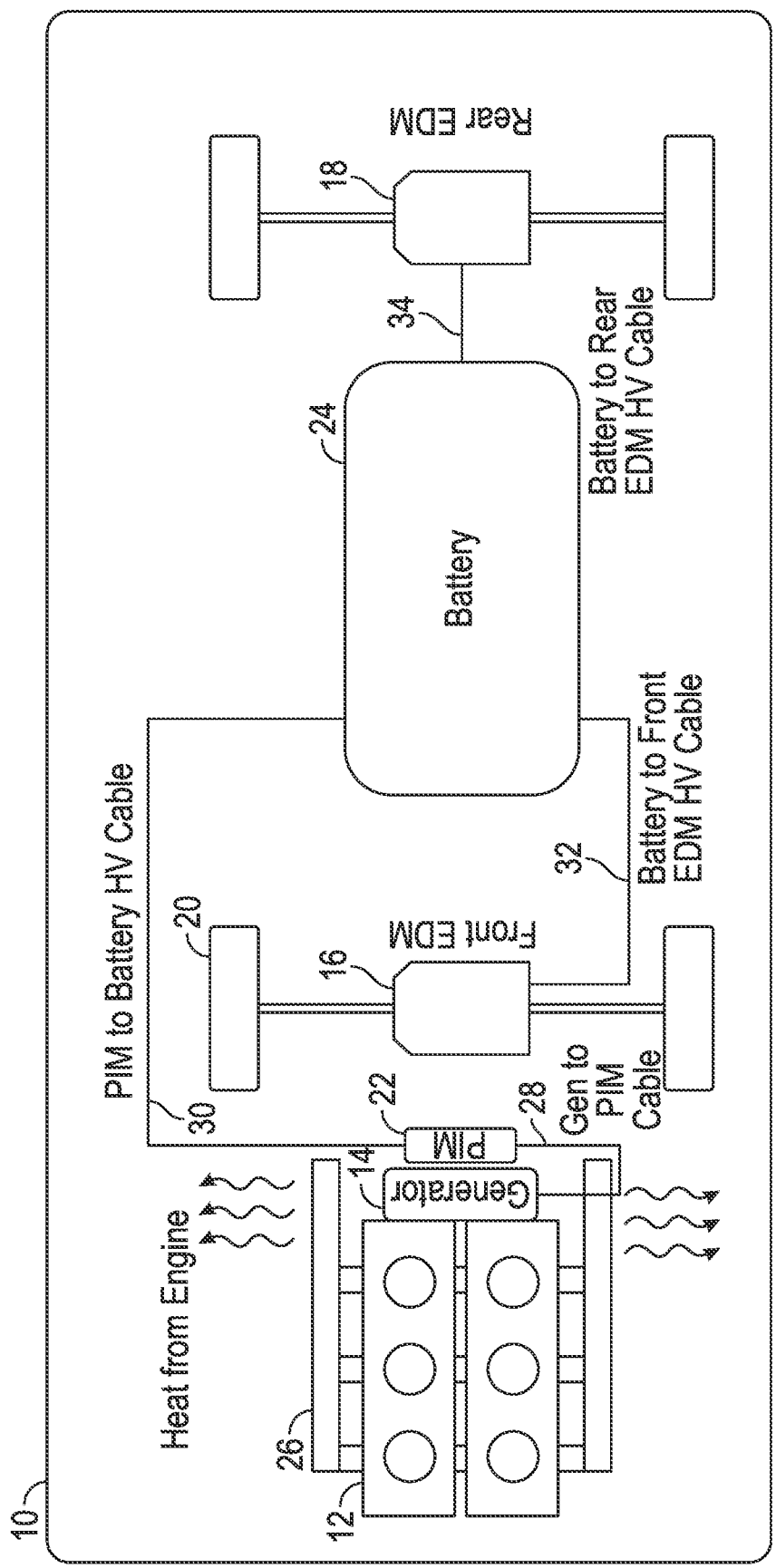
FIG. 1 is a high level block diagram of a high voltage cable layout for a vehicle.

Referring now to FIG. 1, a high level block diagram of a high voltage cable layout for a vehicle 10 is depicted. One example of a HV cable layout, various number of HV cables can be contemplated. Examples of a type of vehicle include, but are not limited to, internal combustion vehicle, hybrid electric vehicle (HEV), plug-in hybrid electric vehicle (PHEV), battery electric vehicle (BEV), range-extended electric vehicles (REEV).

In the depicted example, the vehicle 10 comprises an internal combustion engine 12, a generator 14, a front motor 16, which may be referred to as a front electric drive motor (EDM), and a rear motor 18, which may be referred to as a rear electric drive motor. The front motor 16 and rear motor 18 are connected to and provide motive power to the wheels 20. More than two EDMs such as two rear motors, two front motors or two front motors and two rear motors are other examples. In this example, the engine 12 is not mechanically connected to the wheels 20, but in other examples the engine 12 is mechanically connected to the wheels 20 through a transmission and provides motive force to the wheels 20. The engine 12 is connected to the generator 14 which produces electrical energy for the powertrain from the mechanical energy produced by the engine 12. Though the illustrated example is shown as a series powertrain layout, a parallel powertrain layout may also be used.

The generator 14 is electrically coupled to the power inverter module 22 by a HV cable 28. In one example, the HV cable is a single cable. In another example, the HV comprises one or more cables. The generator 14 provides electrical energy to the power inverter module 22 through the HV cable 28. The power inverter module 22 is connected to the battery 24 by an HV cable 30 and provides electrical energy to the battery 24 through the HV cable 30. The front motor 16 is connected to the battery 24 by an HV cable 32 and receives electrical energy from the battery though the HV cable 32. The rear motor 18 is connected to the battery 24 by an HV cable 34 and receives electrical energy from the battery though the HV cable 34.

In the depicted example, the vehicle 10 is a hybrid comprising an engine 12 that radiates a high temperature and produces high temperature exhaust gases that are routed through exhaust pipes 26. The generator 14, power inverter module 22, and the connected HV cable 28 are in close proximity to the engine 12 and exhaust pipes 26 connected to the engine 12. The closeness at different points depends on various packaging constraints for the particular vehicle. The high temperature of the engine 12 and the high temperature radiating from the exhaust pipes 26 connected to the engine 12 affect HV cable 28 and HV cable 30 as the adjacent high temperature of an engine 12 and the exhaust pipes 26 connected to the engine 12 can exceed the thermal limits of HV cable 28 and HV cable 30.

In an alternative example, the vehicle is an electric vehicle. For an electric vehicle example, the engine 12, the generator 14, the power inverter module 22, the HV cable 28, or the HV cable 30 are not present. However, the high temperatures are also produced by current in the HV cables in electric vehicles.

Figure 2:
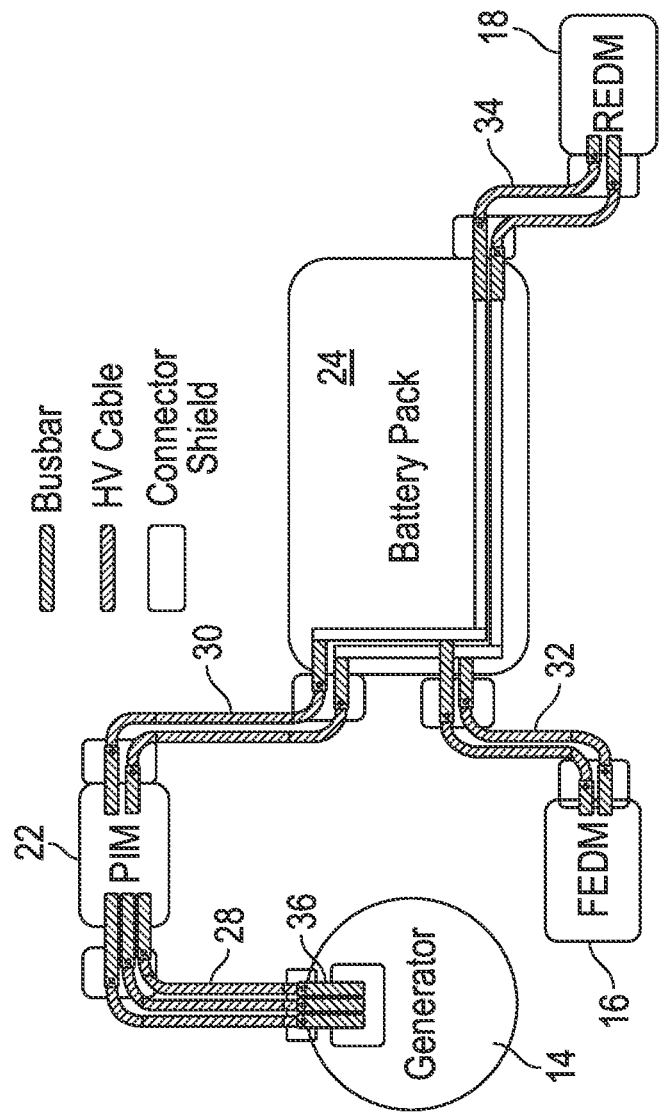
FIG. 2 is a more detailed block diagram of a high voltage cable layout for a vehicle.

Referring now to FIG. 2, a more detailed block diagram of the high voltage cable layout for a hybrid range-extended electric vehicle (REEV) 10 described in FIG. 1 is illustrated. The high voltage layout further comprises one or more HV cables 28 connecting the generator 14 to the power inverter module 22, one or more HV cables 30 connecting the power inverter module 22 to the battery 24, one or more HV cables 32 connecting the battery to the front motor 16, and one or more HV cables 34 connecting the battery pack to the rear motor 18. Each HV cable has a high voltage and a current that varies with the load. As the current in the HV cable increases, the temperature of the HV cable increases.

Each HV cable comprises a first HV cable connector and a second HV cable connector. The first HV cable connector and second HV cable connector each comprise one or more busbars 36 to electrically couple to the components comprised in the high voltage layout.

Figure 3:
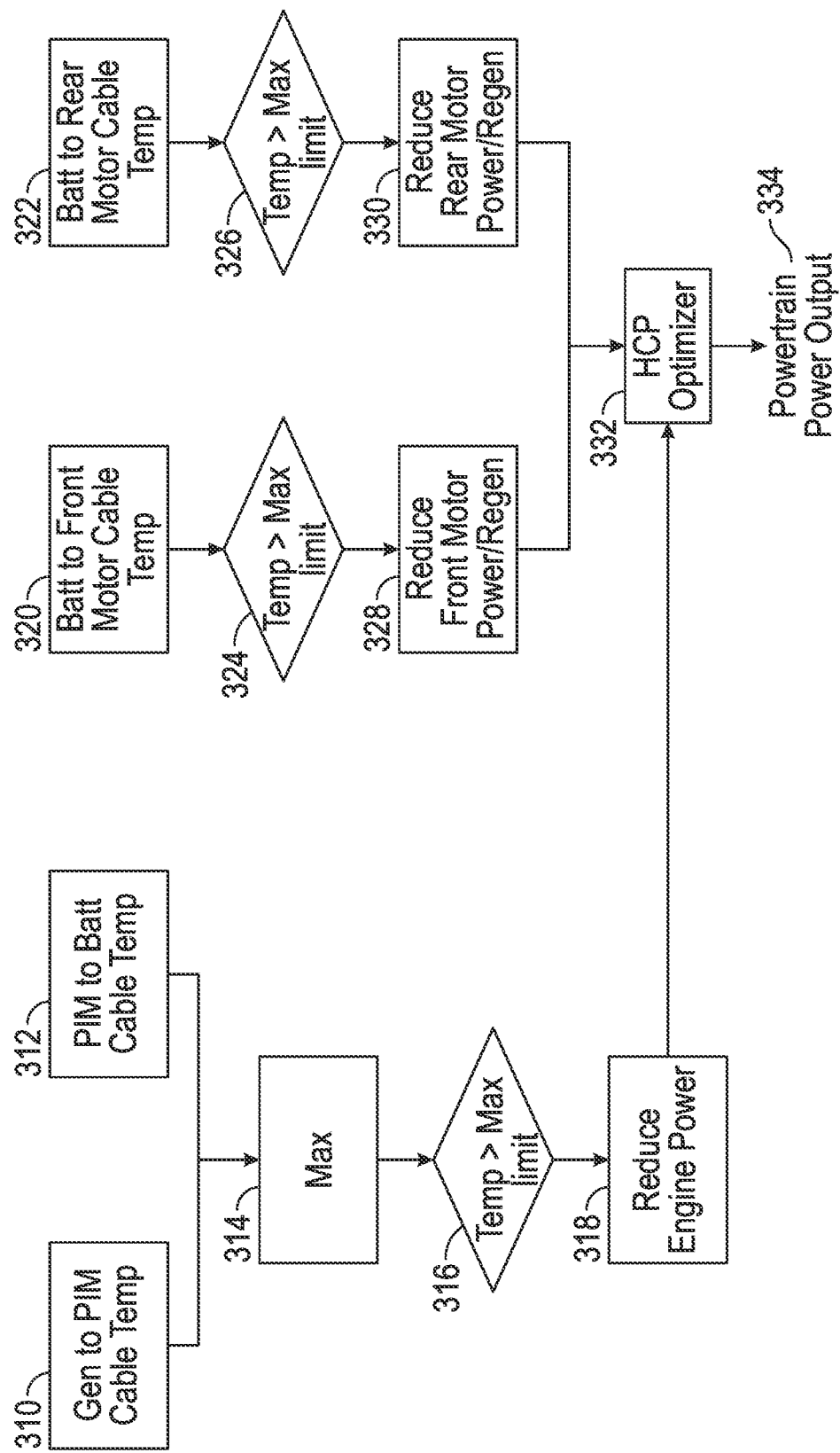
FIG. 3 is a block diagram of a high voltage cable thermal monitor and power management control system.

Referring now to FIG. 3, a block diagram of a high voltage cable thermal monitor and power management control system is depicted. In step 310, an HV cable temperature is determined for the generator-power inverter module cable. In step 312, an HV cable temperature is determined for the power inverter module-battery cable. In step 314, the highest value between the temperature determined in step 310 and step 312 is determined. In step 316, the temperature determined in step 314 is compared to a target temperature. In step 318, if step 316 determines that the temperature determined in step 314 has exceeded the target temperature then an operating characteristic of the powertrain is reduced. In one example, reducing an operating characteristic of the powertrain comprises reducing an operating characteristic of the engine. In another example, reducing an operating characteristic of the powertrain comprises reducing an operating characteristic of the generator.

In step 320, an HV cable temperature is determined for the battery-front motor cable. In step 324, the temperature determined in step 320 is compared to a target temperature. In step 328, if step 324 determines that the temperature determined in step 320 has exceeded the target temperature then an operating characteristic of the powertrain is reduced. In one example, reducing an operating characteristic of the powertrain comprises reducing an operating characteristic of the front motor power. In another example, reducing an operating characteristic of the powertrain comprises reducing an operating characteristic of the front motor regenerative capacity.

In step 322, an HV cable temperature is determined for the battery-rear motor cable. In step 326, the temperature determined in step 322 is compared to a target temperature. In step 330, if step 326 determines that the temperature determined in step 322 has exceeded the target temperature then an operating characteristic of the powertrain is reduced. In one example, reducing an operating characteristic of the powertrain comprises reducing an operating characteristic of the rear motor power. In another example, reducing an operating characteristic of the powertrain comprises reducing an operating characteristic of the rear motor regenerative capacity.

In step 332, a hybrid control processor determines an operating characteristic of the powertrain in view of the determinations in step 318, step 328, and step 330. In step 334, the operating characteristic determined by the hybrid control processor is output to the powertrain.

Figure 4:
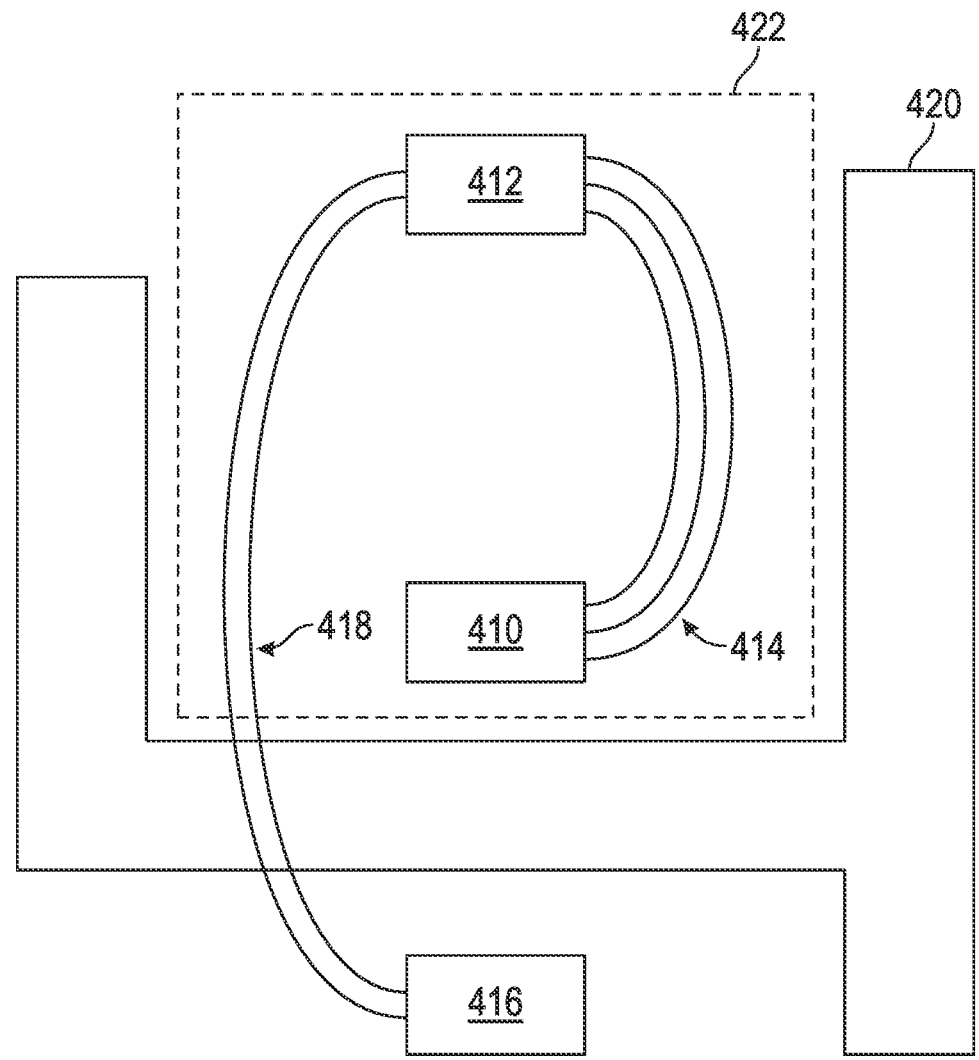
FIG. 4 is a block diagram of high temperature sources in a vehicle with an engine.

Referring now to FIG. 4, the figure depicts high temperature sources adjacent to the generator and the power inverter module in a vehicle 10 with an internal combustion engine, such as a hybrid. The generator 410 is electrically coupled to the power inverter module 412 by HV cables 414. The power inverter module 412 is electrically coupled to the battery 416 by HV cables 418. In one example, the HV cables 418 and the HV cables 414 are affected by one or more adjacent high temperature sources. In one example, adjacent high temperature sources are exhaust pipes 420 and adjacent air temperature 422.

Figure 5:
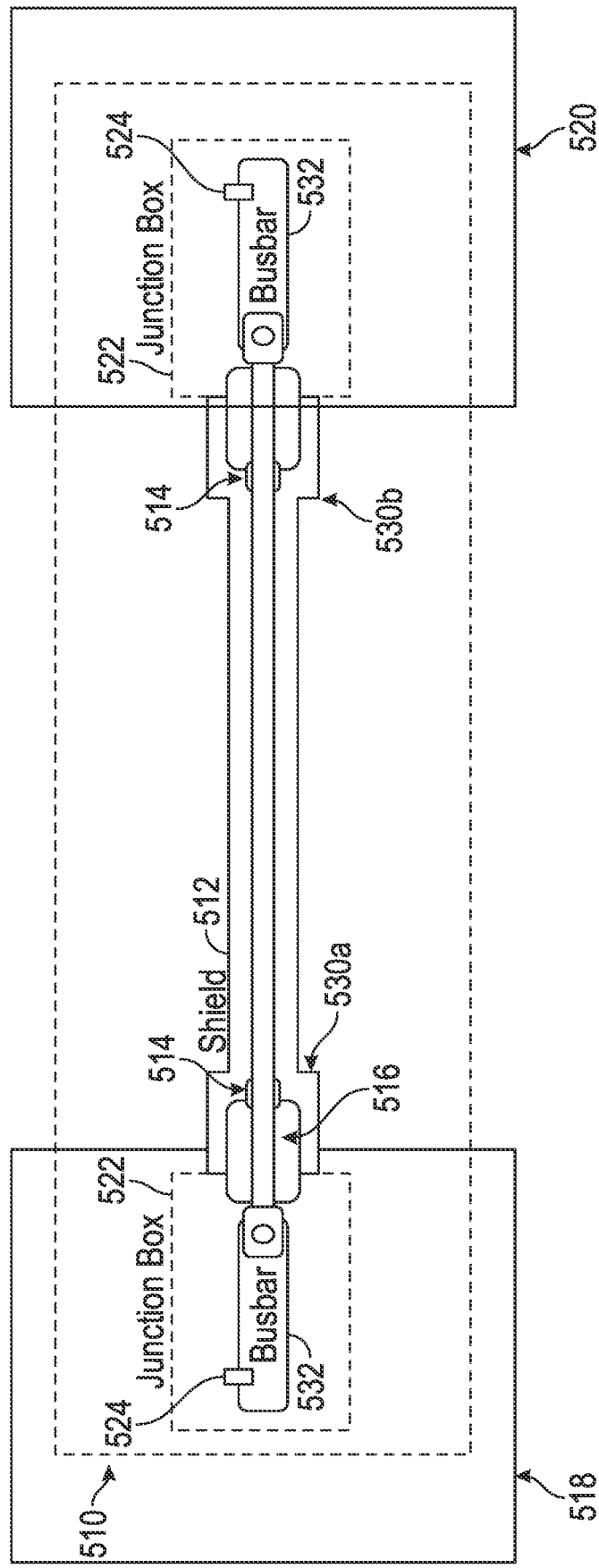
FIG. 5 is a cross-sectional view of a high voltage cable, connectors, and busbars.

Referring now to FIG. 5, a block diagram of one example of an HV cable 510 is depicted. The HV cable is an example of one of the different types of cables in a hybrid or electric vehicle. Examples of HV cables are set forth as the HV cables 28, 30, 32, and 34 in FIG. 1. In one example, the HV cable 510 is wrapped in a shield 512. At each end of the HV cable 510 is a HV cable connector 514. In one example, the HV cable connector 514 is a rear clamp connector. At each end of the HV cable 510 is a HV cable connector holder 516. In one example, the HV cable connector holder 516 is comprised of aluminum. At a first end of the HV cable 530a, the HV cable 510 is electrically and physically coupled to a first component 518. At a second end of the HV cable 530b, the HV cable 510 is electrically and physically coupled to a second component 520.

Examples of the component 518, 520 include, but are not limited to: a generator, a power inverter module, electric drive motor, and a battery.

In one example, the HV cable 510 is physically coupled to one or both components 518, 520 through a junction box 522. In another example, the HV cable 510 is electrically coupled to one or both components 518, 520 by a busbar 532.

In one example, a temperature sensor 524 is adjacent to the busbar 532 in the component 520 and generates a busbar temperature signal. In another example, the temperature sensor 524 is coupled to the busbar in the component 520 and generates a busbar temperature signal. In another example, the temperature sensor 524 is adjacent to the HV cable 510 and generates a busbar temperature signal through a model. In another example, the temperature sensor 524 is coupled to the HV cable 510 and generates a busbar temperature signal through a model. In another example, the temperature sensor 524 is replaced by a model.

Figure 6:
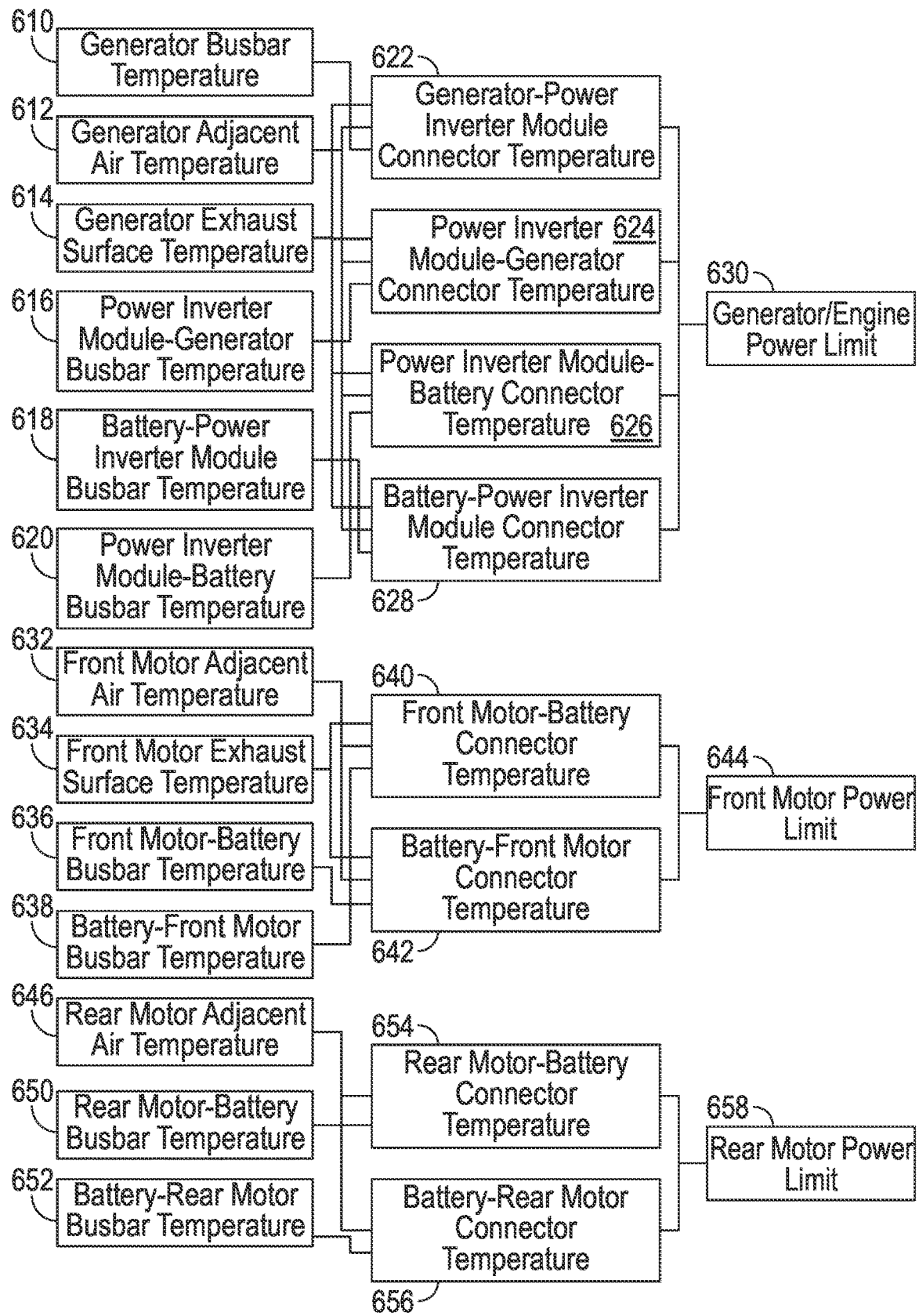
FIG. 6 is a high level block diagram showing the interconnection of various components through the system in accordance with the present disclosure.

Referring now to FIG. 6, a high level block diagram showing the temperature modules used for performing various limiting functions of the vehicle is set forth. All of the temperatures below are communicated in a temperature signal corresponding to each module. A generator busbar temperature 610 is determined for the generator 14. A generator adjacent air temperature 612 is determined for the generator 14. A generator exhaust surface temperature 614 is determined for the generator 14. A power inverter module-generator busbar temperature 616 is determined for the power inverter module 22 busbar electrically coupled with the generator 14. A battery-power inverter module busbar temperature 618 is determined for the battery 24 busbar electrically coupled with the power inverter module 22. A power inverter module-battery busbar temperature 620 is determined for the power inverter module 22 busbar electrically coupled with the battery 24.

A generator-power inverter module connector temperature 622 is determined for a HV cable connector adjacent to the generator 14 and electrically coupled with the power inverter module 22 from the generator busbar temperature 610, the generator adjacent air temperature 612, and the generator exhaust surface temperature 614. A power inverter module-generator connector temperature 624 is determined for a HV cable connector adjacent to the power inverter module 22 and electrically coupled with the generator 14 from the power inverter module-generator busbar temperature 616, the generator adjacent air temperature 612, and the generator exhaust surface temperature 614. A power inverter module-battery connector temperature 626 is determined for a HV cable connector adjacent to the power inverter module 22 and electrically coupled with the battery 24 from the power inverter module-battery busbar temperature 620, the generator adjacent air temperature 612, and the generator exhaust surface temperature 614. A battery-power inverter module connector temperature 628 is determined for a HV cable connector adjacent to the battery 24 and electrically coupled with the power inverter module 22 from the battery-power inverter module busbar temperature 618, the generator adjacent air temperature 612, and the generator exhaust surface temperature 614.

A generator power limit or engine power limit module 630 determines a generator power limit or engine power limit from the generator-power inverter module connector temperature 622, the power inverter module-generator 624, the power inverter module-battery connector temperature 626, and the battery-power inverter module connector temperature 628.

A front motor adjacent air temperature 632 is determined for the front motor 16. A front motor exhaust surface temperature 634 is determined for the front motor 16. A front motor-battery busbar temperature 636 is determined for the front motor 16 busbar electrically coupled with the battery 24. A battery-front motor busbar temperature 638 is determined for the battery 24 busbar electrically coupled with the front motor 16.

A front motor-battery connector temperature 640 is determined for a HV cable connector adjacent to the front motor 16 and electrically coupled with the battery 24 from the front motor-battery busbar temperature 636, the front motor adjacent air temperature 632, and the front motor exhaust surface temperature 634. A battery-front motor connector temperature 642 is determined for a HV cable connector adjacent to the battery 24 and electrically coupled with the front motor 16 from the battery-front motor busbar temperature 638, the front motor adjacent air temperature 632, and the front motor exhaust surface temperature 634.

A front motor power limit module 644 determines a front motor power limit from the front motor-battery connector temperature 640 and the battery-front motor connector temperature 642.

A rear motor adjacent air temperature 646 is determined for the rear motor 18. A rear motor-battery busbar temperature 650 is determined for the rear motor 18 busbar electrically coupled with the battery 24. A battery-rear motor busbar temperature 652 is determined for the battery 24 busbar electrically coupled with the rear motor 18.

A rear motor-battery connector temperature 654 is determined for a HV cable connector adjacent to the rear motor 18 and electrically coupled with the battery 24 from the rear motor-battery busbar temperature 650 and the rear motor adjacent air temperature 646. A battery-rear motor connector temperature 656 is determined for a HV cable connector adjacent to the battery 24 and electrically coupled with the rear motor 18 from the battery-rear motor busbar temperature 652 and the rear motor adjacent air temperature 646.

A rear motor power limit module 658 determines a rear motor power limit from the rear motor-battery connector temperature 654 and the battery-rear motor connector temperature 656.

In one example, the vehicle 10 is an electric vehicle. For an electric vehicle, the generator exhaust surface temperature 614 and the front motor exhaust surface temperature 634 are omitted.

Figure 7:
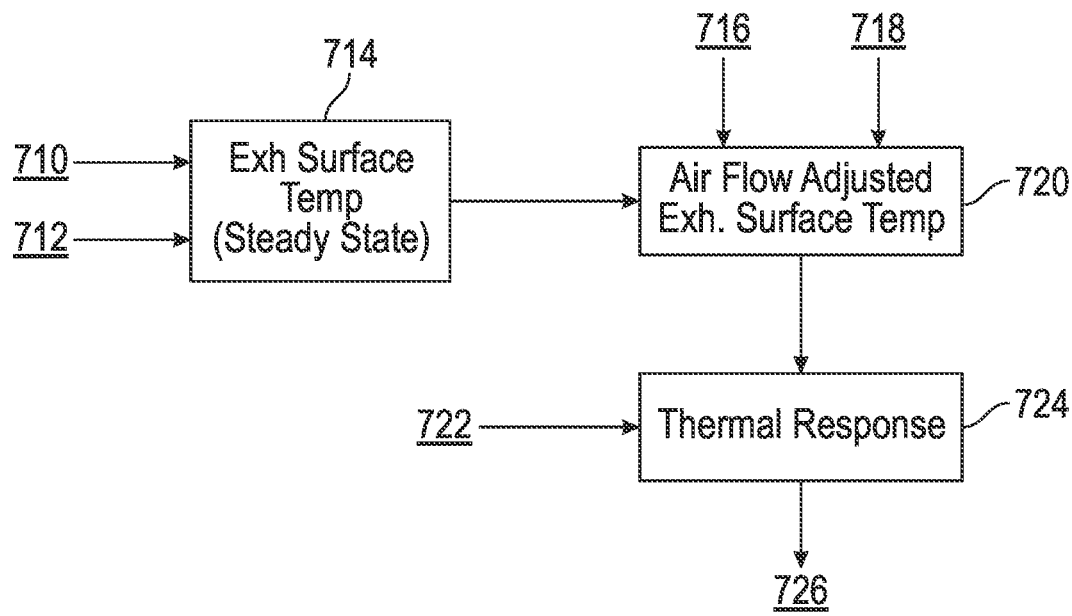
FIG. 7 is a block diagram of an exhaust surface temperature model.

Referring now to FIG. 7, a block diagram of an exhaust surface temperature model is depicted. A steady state exhaust surface temperature 714 is determined from an exhaust gas temperature 710 and an adjacent air temperature 712. An air flow adjusted exhaust surface temperature 720 is determined from the steady state exhaust surface temperature 714, a vehicle speed 716, and a fan speed 718. In one example, the fan is a radiator fan. A thermal response model 724 determines an exhaust surface temperature 726 from the air flow adjusted exhaust surface temperature 720 and a thermal response coefficient 722.

Figure 8:
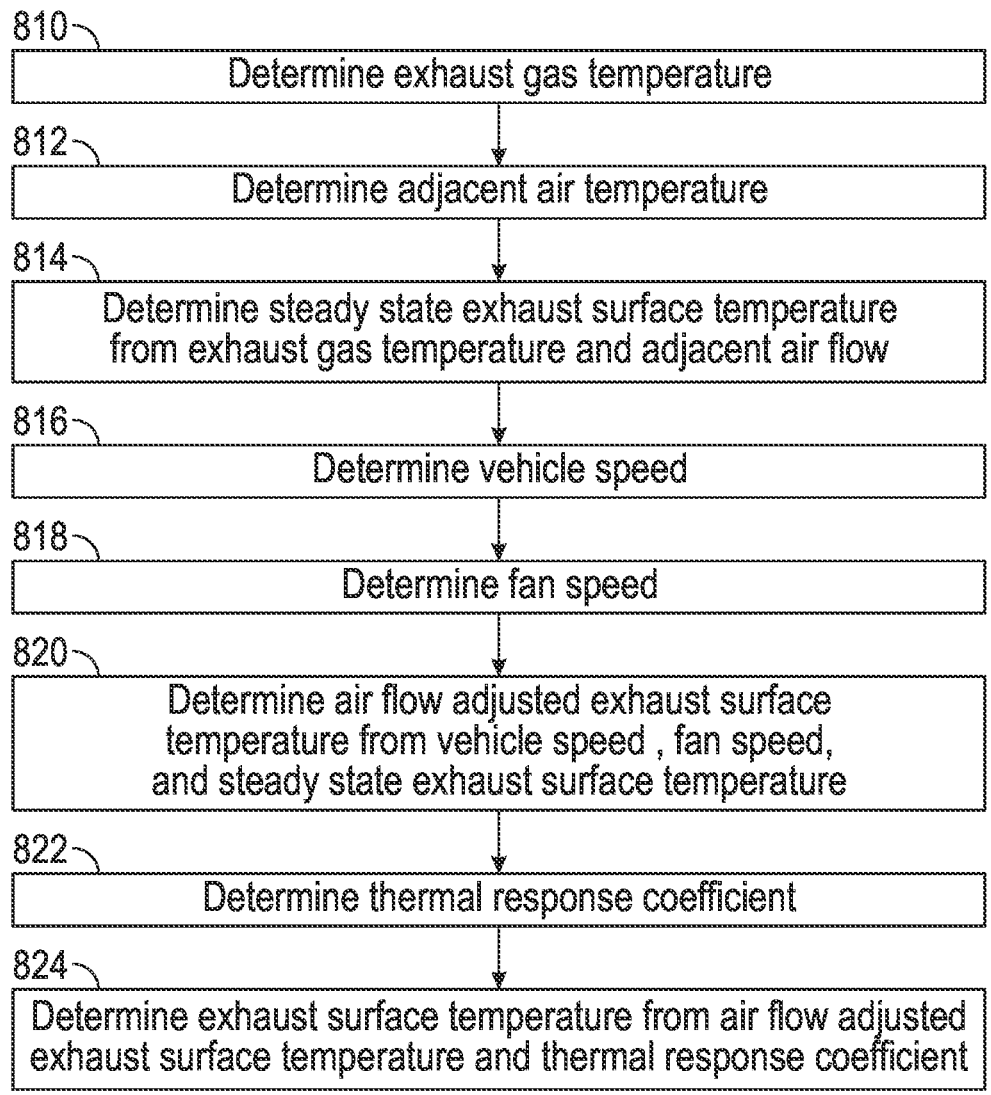
FIG. 8 is a flowchart of an exhaust surface temperature model.

Referring now to FIG. 8, a flowchart of an exhaust surface temperature model is depicted. In step 810 an exhaust gas temperature 710 is determined. In step 812 an adjacent air temperature 712 is determined. In step 814, a steady state exhaust surface temperature 714 is determined from the exhaust gas temperature 710 and the adjacent air temperature 712. In step 816, a vehicle speed 716 is determined. In step 818, a fan speed 718 is determined. In step 820, an air flow adjusted exhaust surface temperature 720 is determined from the vehicle speed 716, the fan speed 718, and the steady state exhaust surface temperature 714. In step 822, a thermal response coefficient 722 is determined. In step 824, a thermal response model 724 determines an exhaust surface temperature 726 from the air flow adjusted exhaust surface temperature 720 and a thermal response coefficient 722.

Figure 9:
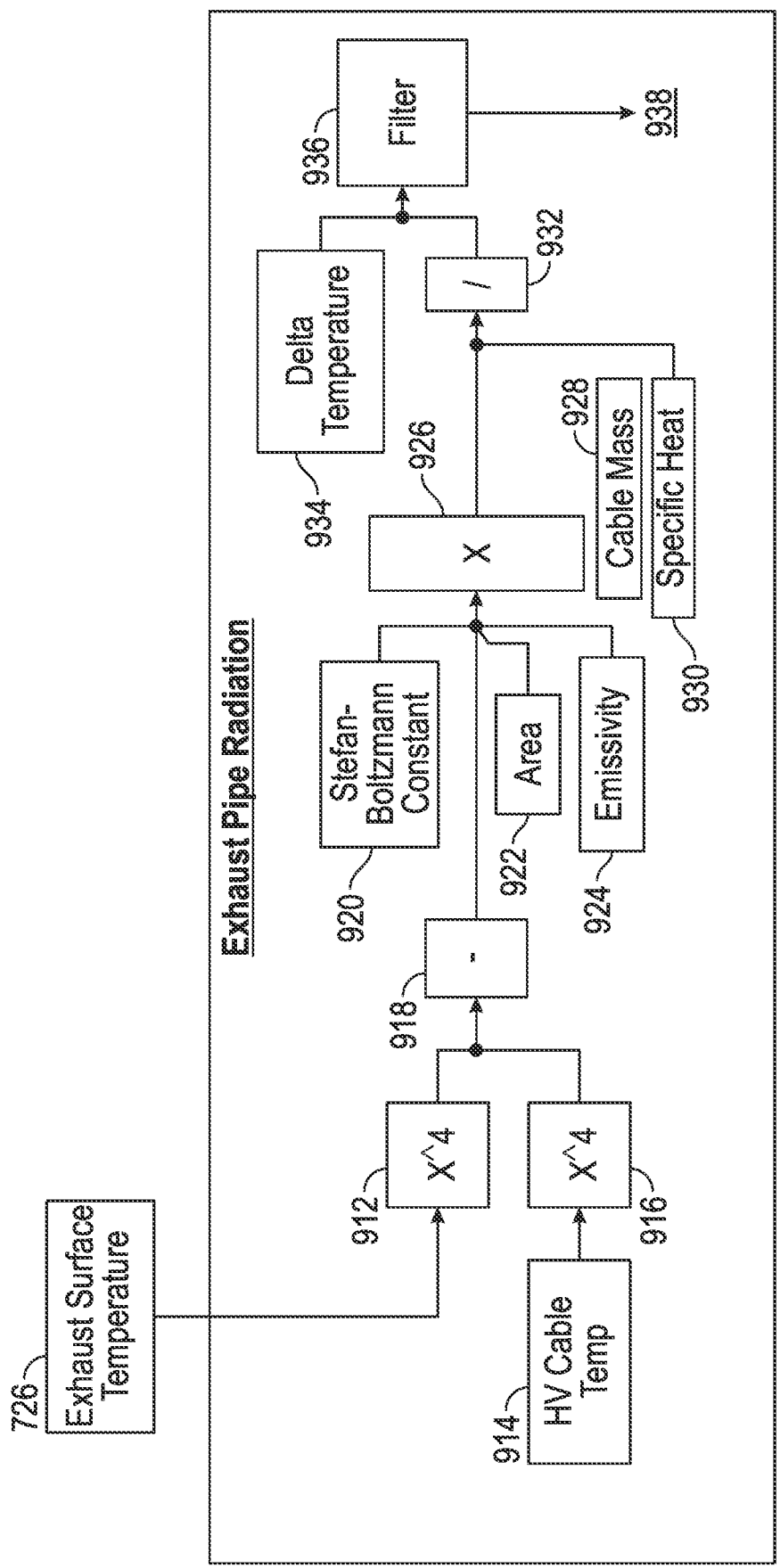
FIG. 9 is a block diagram of an exhaust pipe radiation model.

Referring now to FIG. 9, a block diagram of an exhaust pipe radiation model is depicted. An exhaust surface temperature 726 is raised to the $4^{th}$ power at an exponent block 912. Although a $4^{th}$ power is depicted, other examples use different exponents. An HV cable temperature 914 is raised to the 4th power at an exponent block 916. The result of the exponent block 912 is subtracted from the result of the exponent block 916 at a subtraction block 918. The result of the subtraction block 918 is multiplied with a Stefan-Boltzmann constant 920, an area of an HV cable 922, and an emissivity of the HV cable 924 at a multiplication block 926. The result of the multiplication block 926 is divided by the cable mass 928 and the specific heat 930. at a division block 932. The result of the division block 932 and a delta temperature 934 are filtered by a standard first order filter at a filter block 936. The result of the filter block 936 is an exhaust pipe radiation 938.

Figure 10:
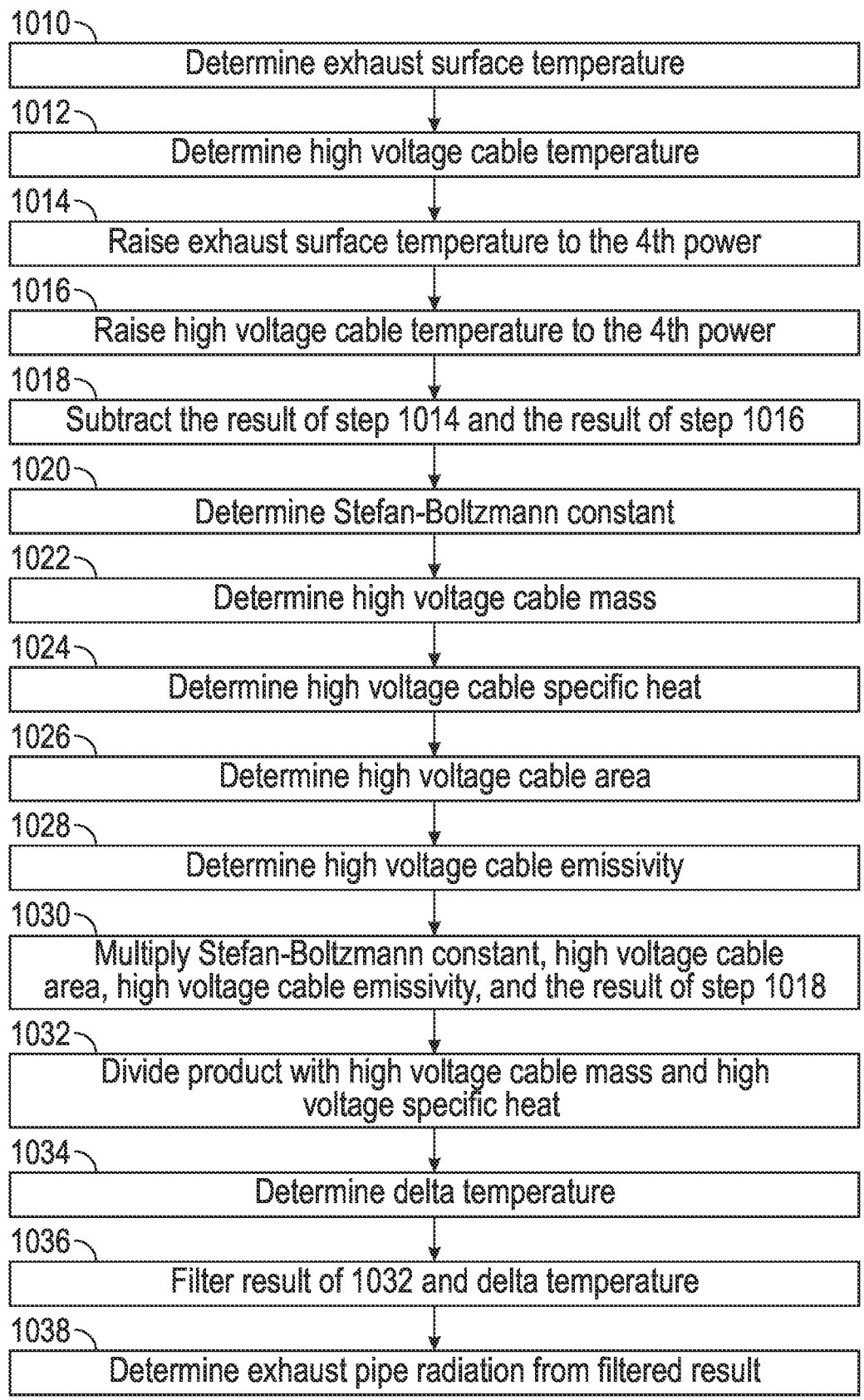
FIG. 10 is a flowchart of an exhaust pipe radiation model.

Referring now to FIG. 10, a flow chart of an exhaust pipe radiation model is depicted. In step 1010, an exhaust surface temperature is determined from the exhaust surface temperature model in FIG. 7. In step 1012, a HV cable temperature is determined. In step 1014, the exhaust surface temperature is raised to the 4th power. In step 1016, the HV cable temperature is raised to the 4th power. In step 1018, the result of step 1014 and the result of step 1016 is subtracted. In step 1020, the Stefan-Boltzmann constant is determined. In step 1022, a HV cable mass is determined. In step 1024, a HV cable specific heat or temperature is determined. In step 1026, a HV cable area is determined. In step 1028, a HV cable emissivity is determined. In step 1030, the result of step 1018 is multiplied with the Stefan-Boltzmann constant, the HV cable area, and the HV cable emissivity. In step 1032, the result is divided by the cable mass and the specific heat. In step 1034, a delta temperature is determined. In step 1036, the result of step 1032 is filtered by a standard first order filter. In step 1038, an exhaust pipe radiation is determined from the filtered result.

Figure 11A:
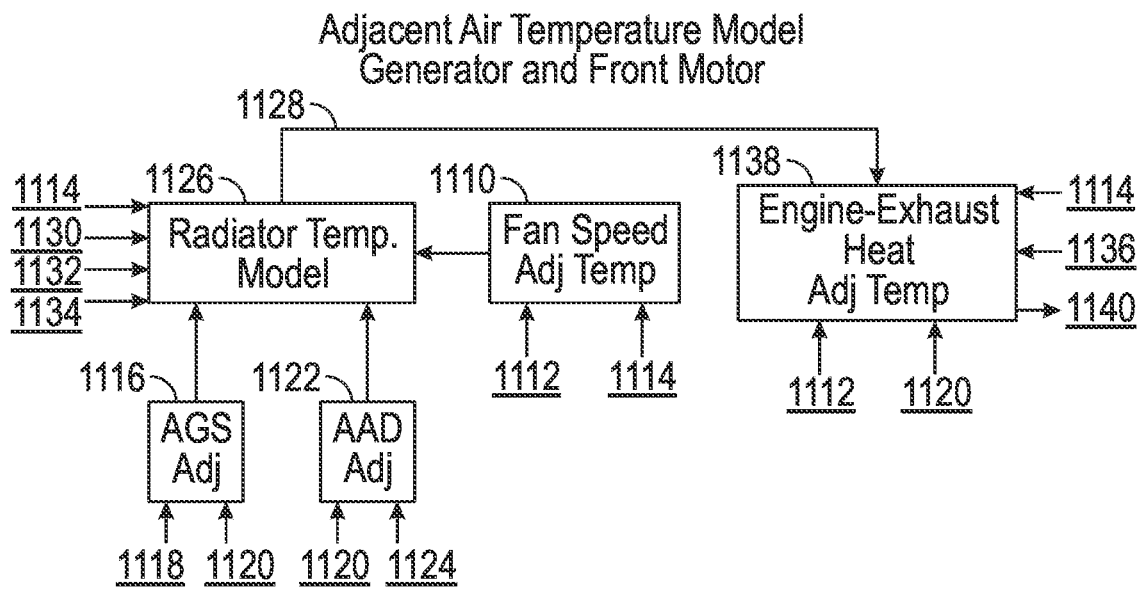
FIG. 11A is a block diagram of an adjacent air temperature model for a generator and front electric drive motor.

Referring now to FIG. 11A, a block diagram of an adjacent air temperature model for a generator and front electric drove motor is depicted. A fan speed adjusted temperature 1110 is determined from a fan speed 1112 and an ambient temperature 1114. An active grill shutters adjusted temperature 1116 is determined from an active grill shutters position 1118 and a vehicle speed 1120. An active air dam adjusted temperature 1122 is determined from the vehicle speed 1120 and an active air dam position 1124.

A radiator temperature model 1126 determines a radiator temperature 1128 from an ambient temperature 1114, an engine coolant temperature 1130, an active grill shutters adjusted temperature 1116, an active air dam adjusted temperature 1122, and a fan speed adjusted temperature 1110. In one example, the vehicle 10 has a low temperature radiator in addition to a radiator. In this example, the radiator temperature model 1126 determines a radiator temperature from an ambient temperature 1114, an engine coolant temperature 11130, an active grill shutters adjusted temperature 1116, an active air dam adjust temperature 1122, a fan speed adjusted temperature 1110, a low temperature radiator temperature 1132, and a low temperature radiator mode 1134.

An engine-exhaust heat adjusted temperature 1138 is determined from an exhaust surface temperature 1136, the vehicle speed 1120, the fan speed 1112, the ambient temperature 1114, and the radiator temperature 1128. An adjacent air temperature 1140 is determined from the engine-exhaust heat adjusted temperature 1138.

Figure 11B:
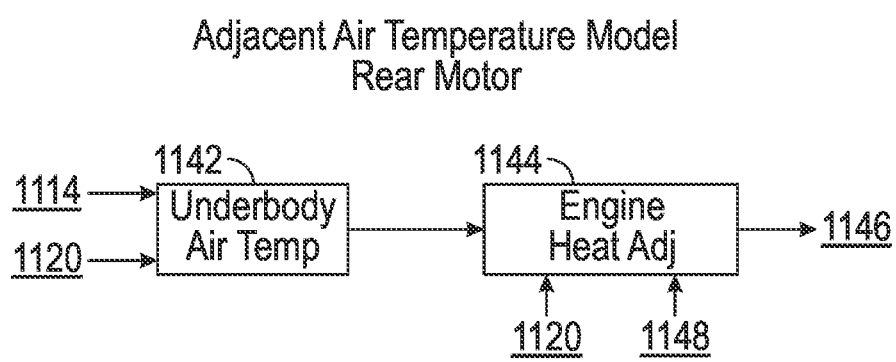
FIG. 11B is a block diagram of an adjacent air temperature model for a rear electric drive motor.

Referring now to FIG. 11B, a block diagram of an adjacent air temperature model for a rear electric drove motor is depicted. An underbody air temperature 1142 is determined from the ambient temperature 1114 and the vehicle speed 1120.

An engine heat adjusted temperature 1144 is determined from an engine oil temperature 1148, the vehicle speed 1120, and the underbody air temperature 1142. An adjacent air temperature 1146 is determined from the engine heat adjusted temperature 1144.

Figure 12A:
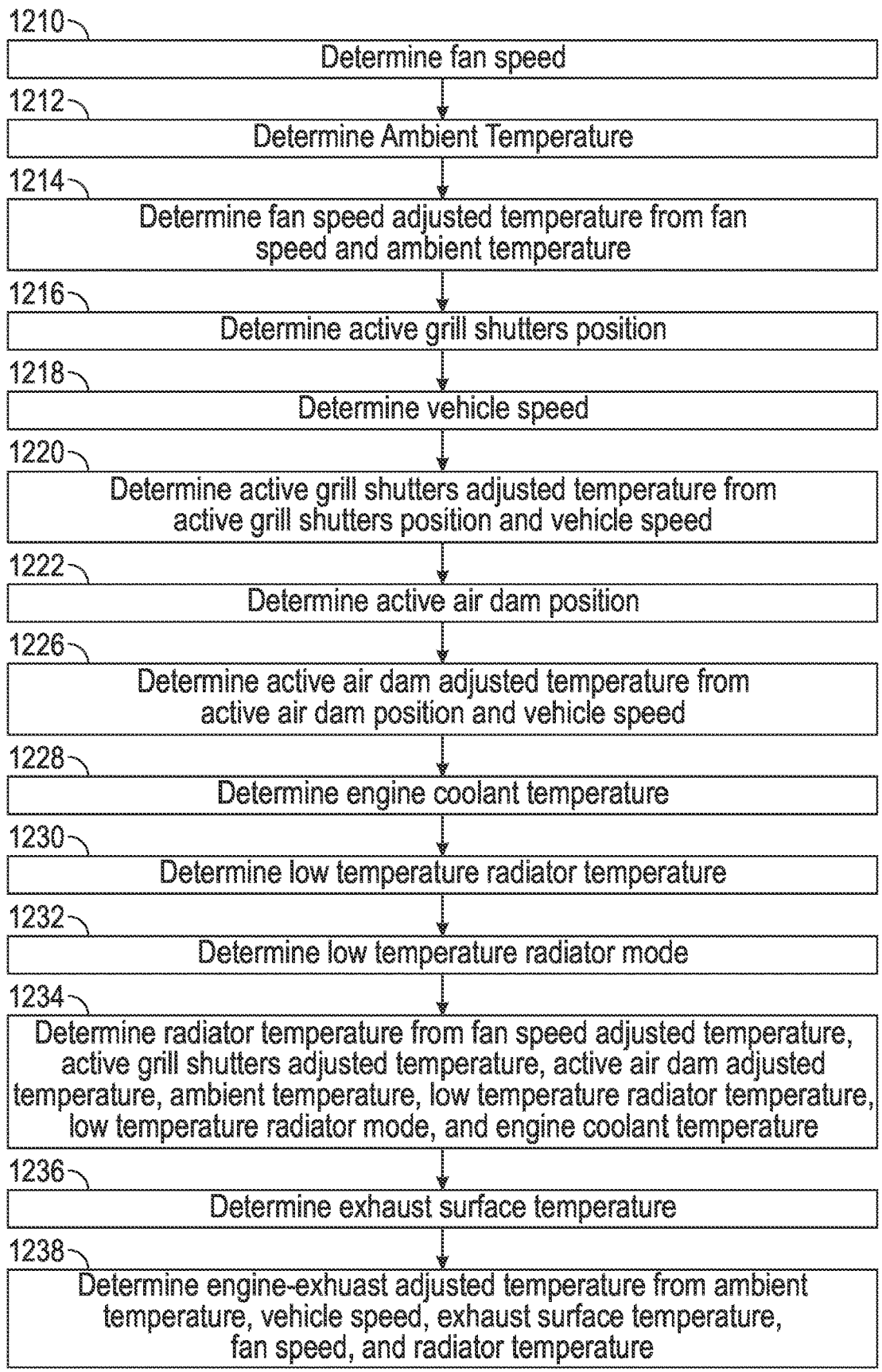
FIG. 12A is a flowchart of an adjacent air temperature model for a generator and front electric drive motor.

Referring now to FIG. 12A, a flow chart of an adjacent air temperature model for a generator and front motor is depicted. In step 1210, a fan speed is determined. In step 1212, an ambient temperature is determined. In step 1214, a fan speed adjusted temperature is determined from the fan speed and the ambient temperature. In step 1216, an active grill shutters position is determined. In step 1218, a vehicle speed is determined. In step 1220, an active grill shutter adjusted temperature from active grill shutters position and vehicle speed. In step 1222, an active air dam position is determined. In step 1226, an active air dam adjusted temperature is determined from an active air dam position and vehicle speed. In step 1228, an engine coolant temperature is determined. In step 1230, a low temperature radiator temperature is determined. In step 1232, a low temperature radiator mode is determined. In step 1234, a radiator temperature is determined from the fan speed adjusted temperature, the active grill shutters adjusted temperature, the active air dam adjusted temperature, the ambient temperature, and the engine coolant temperature. In one example, the vehicle 10 has a low temperature radiator in addition to a radiator. In this example, a radiator temperature is determined from the fan speed adjusted temperature, the active grill shutters adjusted temperature, the active air dam adjusted temperature, the ambient temperature, the engine coolant temperature, the low temperature radiator temperature, and the low temperature radiator mode. In step 1236, an exhaust surface temperature is determined from the exhaust surface temperature model in FIG. 7. In step 1238, an engine-exhaust adjusted temperature is determined from the ambient temperature, the vehicle speed, the exhaust surface temperature, fan speed, and radiator temperature.

Figure 12B:
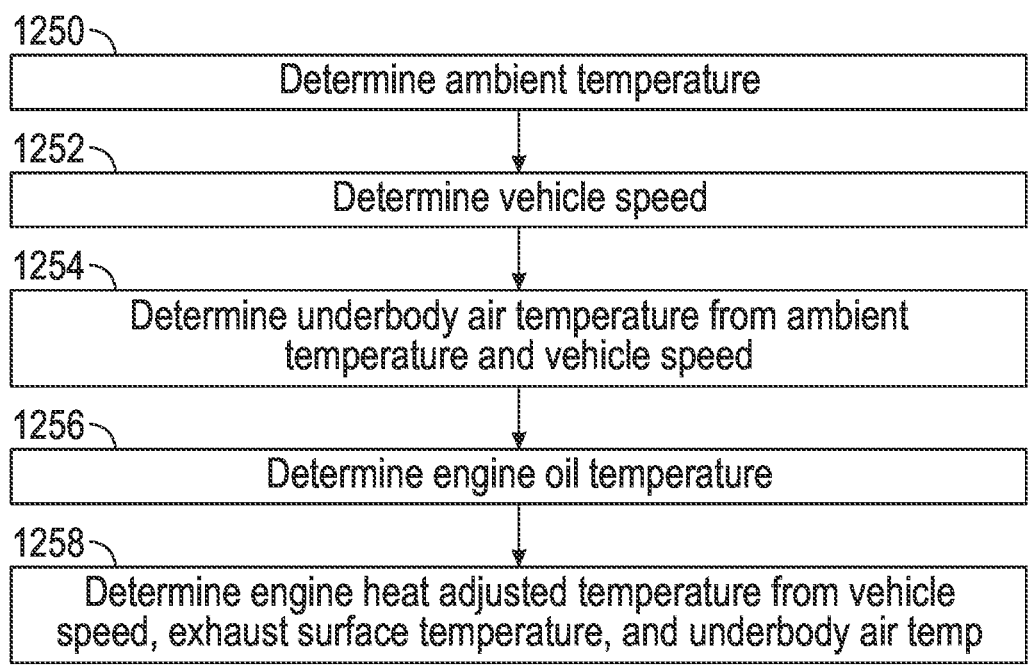
FIG. 12B is a flowchart of an adjacent air temperature model for a rear electric drive motor.

Referring now to FIG. 12B, a flowchart of an adjacent air temperature model for a rear electric drove motor is depicted. In step 1250, an ambient temperature is determined. In step 1252, a vehicle speed is determined. In step 1254, an underbody air temperature is determined from the ambient temperature and the vehicle speed. In step 1256, an engine oil temperature is determined. In step 1258, an engine heat adjusted temperature from the vehicle speed, the engine oil temperature, and the underbody air temperature.

Figure 13:
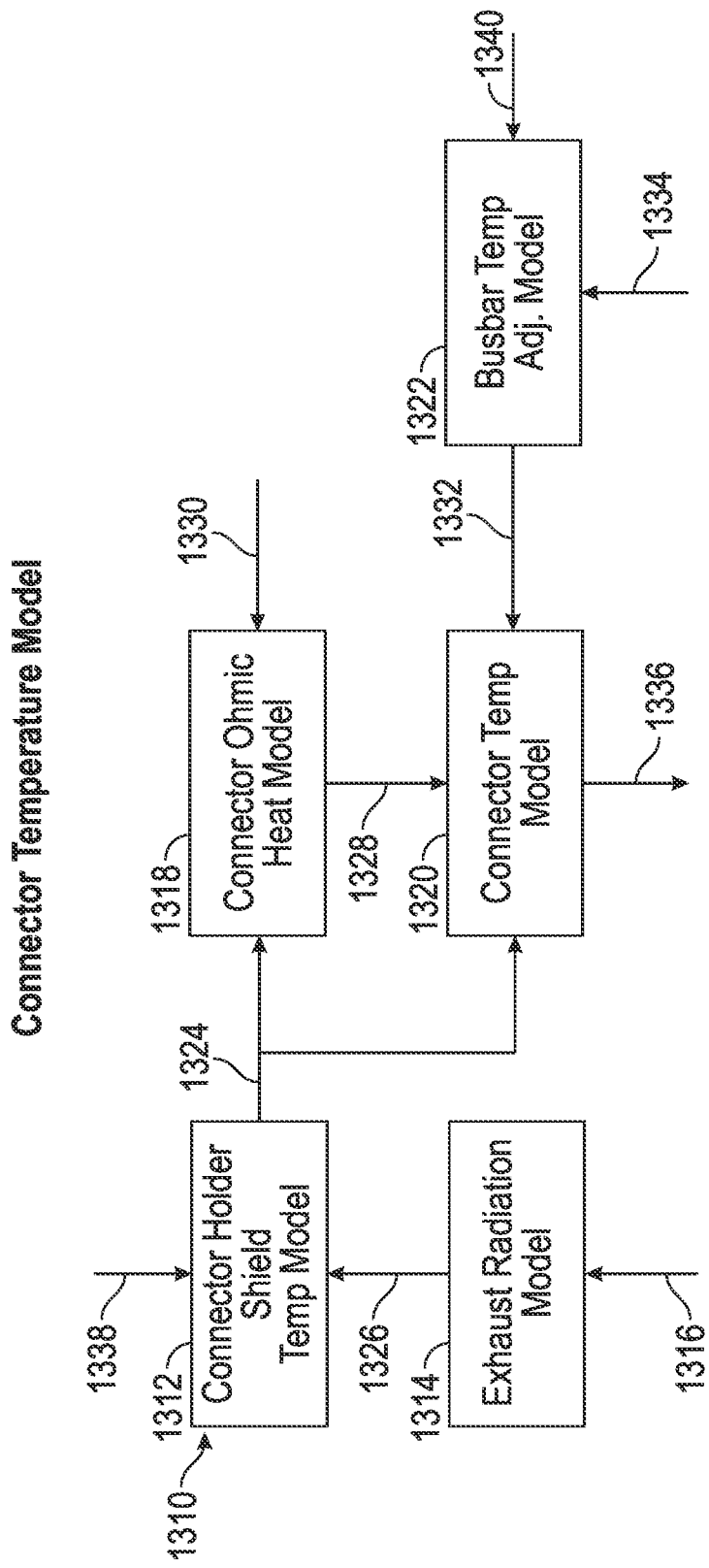
FIG. 13 is a block diagram of a connector temperature model.

Referring now to FIG. 13, a block diagram of a connector temperature model is depicted. An exhaust radiation model 1314 determines an exhaust radiation 1326 from an exhaust surface temperature 1316. A connector holder shield temperature model 1312 determines a connector holder shield temperature 1324 from the exhaust radiation 1326, an adjacent air temperature 1338, and a connector holder shield ohmic heat (temperature) 1310. A connector ohmic heat model 1318 determines a connector ohmic heat or temperature 1328 from a connector holder shield temperature 1324 and a current 1330. A busbar adjusted temperature model 1322 determines a busbar adjusted temperature 1332 from a busbar temperature 1334 and a nominal busbar temperature 1340. A connector temperature model 1320 determines a connector temperature 1336 from a busbar adjusted temperature 1332, a connector ohmic heat or temperature 1328, and a connector holder shield temperature 1324.

Figure 14:
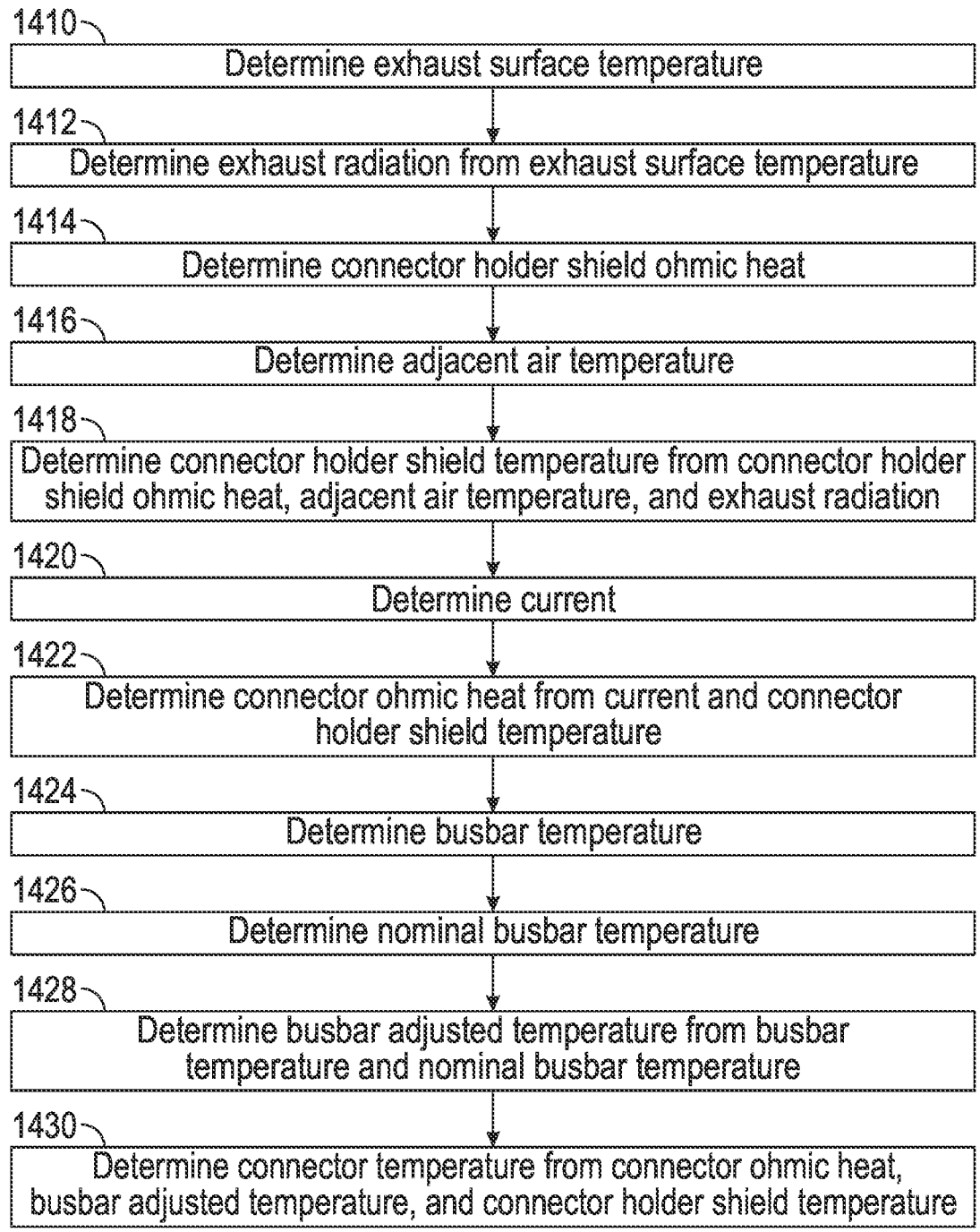
FIG. 14 is a flowchart of a connector temperature model.

Referring now to FIG. 14, a flowchart of a connector temperature model is depicted. In step 1410, an exhaust surface temperature is determined from the exhaust surface temperature model in FIG. 7. In step 1412, an exhaust radiation is determined from the exhaust surface temperature. In step 1414, a connector holder shield ohmic heat or temperature is determined. In step 1416, an adjacent air temperature is determined. In step 1418, a connector holder shield temperature is determined from the connector holder shield ohmic heat or temperature, the adjacent air temperature, and the exhaust radiation. In step 1420, a current is determined. In step 1422, a connector ohmic heat or temperature is determined from a current and a connector holder shield temperature. In step 1424, a busbar temperature is determined. In step 1426, a nominal busbar temperature is determined. In step 1428, a busbar adjusted temperature is determined from the busbar temperature and the nominal busbar temperature. In step 1430, a connector temperature is determined from the connector ohmic heat or temperature, the busbar adjusted temperature, and the connector holder shield temperature.

Figure 15:
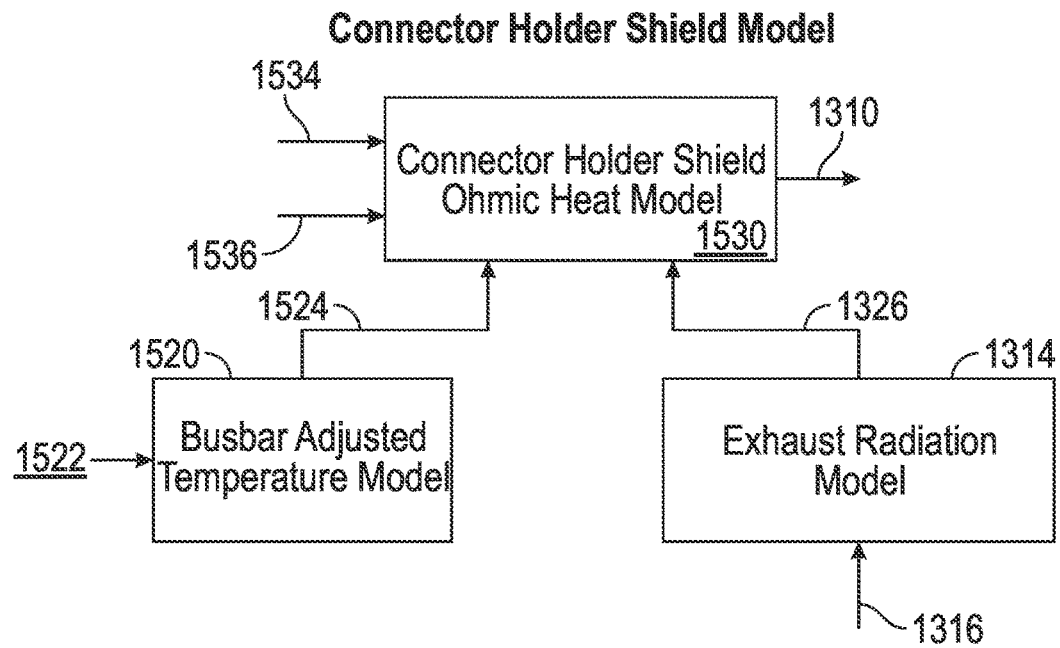
FIG. 15 is a block diagram of a connector holder shield model.

Referring now to FIG. 15, a block diagram of a connector holder shield model is depicted. The exhaust radiation model 1314 determines the exhaust radiation 1326 from the exhaust surface temperature 1316. A busbar adjusted temperature model 1520 determines a busbar adjusted temperature 1524 from a busbar temperature 1522. A connector holder shield ohmic heat model 1530 determines the connector holder shield ohmic heat or temperature 1310 from the busbar adjusted temperature 1524, a current 1534, an adjacent air temperature 1536, and the exhaust radiation 1326.

Figure 16:
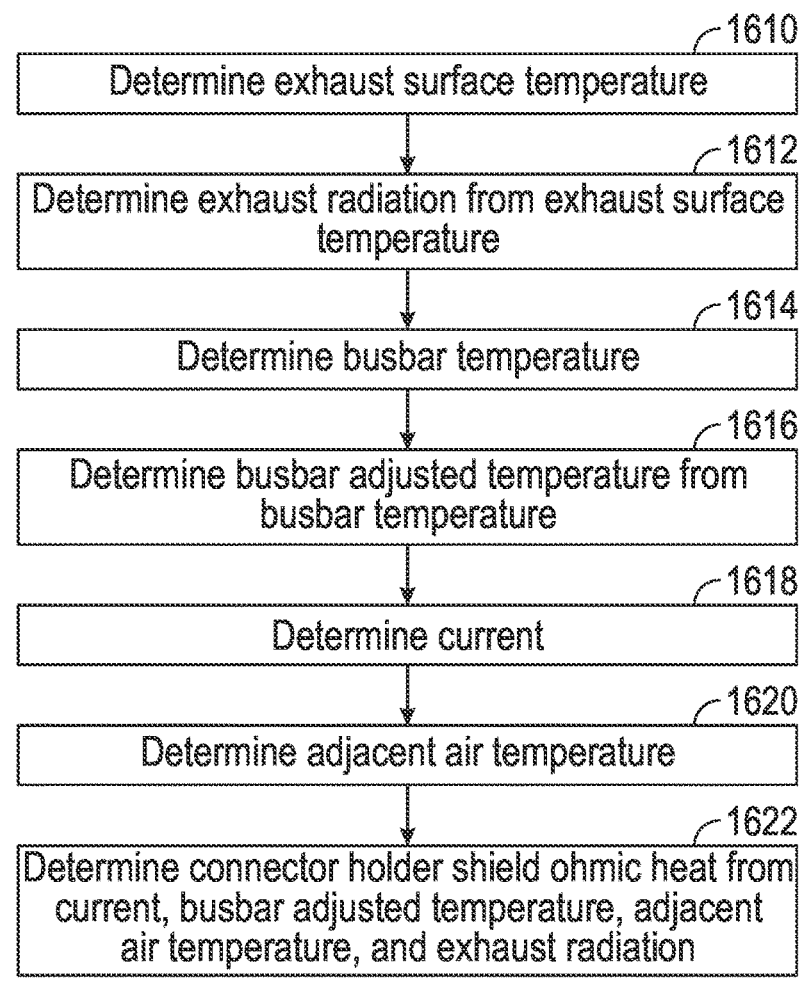
FIG. 16 is a flowchart of a connector holder shield model.

Referring now to FIG. 16, a flowchart of a connector holder shield model is depicted. In step 1610, an exhaust surface temperature is determined. In step 1612, an exhaust radiation from the exhaust surface temperature. In step 1614, a busbar temperature is determined. In step 1616, a busbar adjusted temperature is determined from the busbar temperature. In step 1618, a current is determined. In step 1620, an adjacent air temperature is determined. In step 1622, a connector holder shield ohmic heat (temperature) is determined from the current, the busbar adjusted temperature, the adjacent air temperature, and the exhaust radiation.

Figure 17:
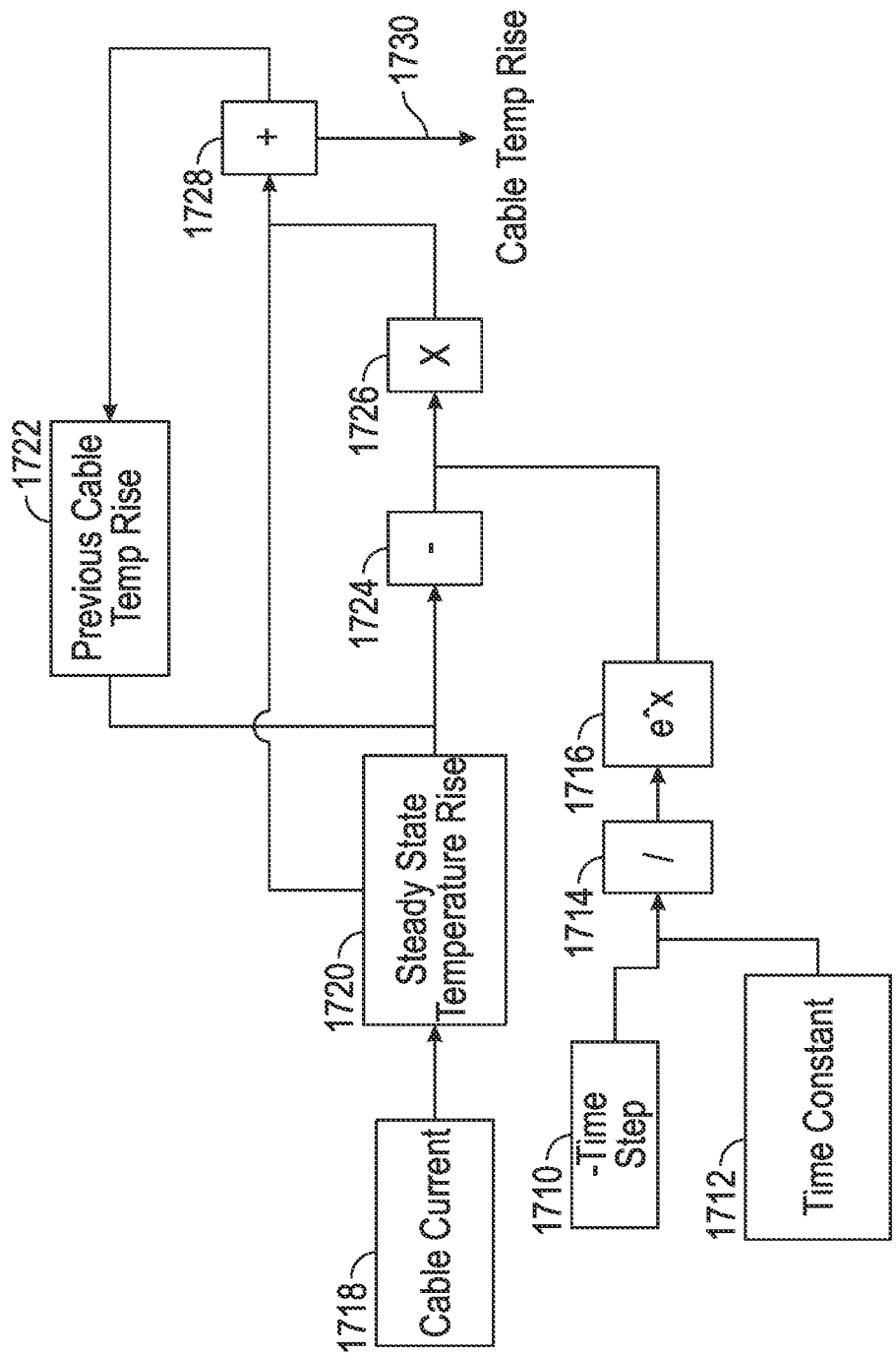
FIG. 17 is a block diagram of a thermal cable model.

Referring now to FIG. 17, a block diagram for a thermal cable model is depicted. A negative time step 1710 is determined. A time constant 1712 is determined. The negative time step is divided the time constant 1712 at a division block 1714. The result of the division block 1714 is the exponent of Euler's constant 1716 at a Euler's constant block. A steady state temperature rise 1720 is determined from a current 1718. A previous cable temperature rise 1722 is determined from a previous calculation of an addition block 1728. The previous cable temperature rise 1722 is subtracted from the steady state temperature rise 1720 at a subtraction block 1724. The result of the subtraction block 1724 is multiplied with the result of the Euler's constant block 1716 at a multiplication block 1726. The result of the multiplication block 1726 is added to the steady state temperature rise 1720 at the addition block 1728. The result of the addition block 1728 determines a cable temperature rise 1730.

Figure 18:
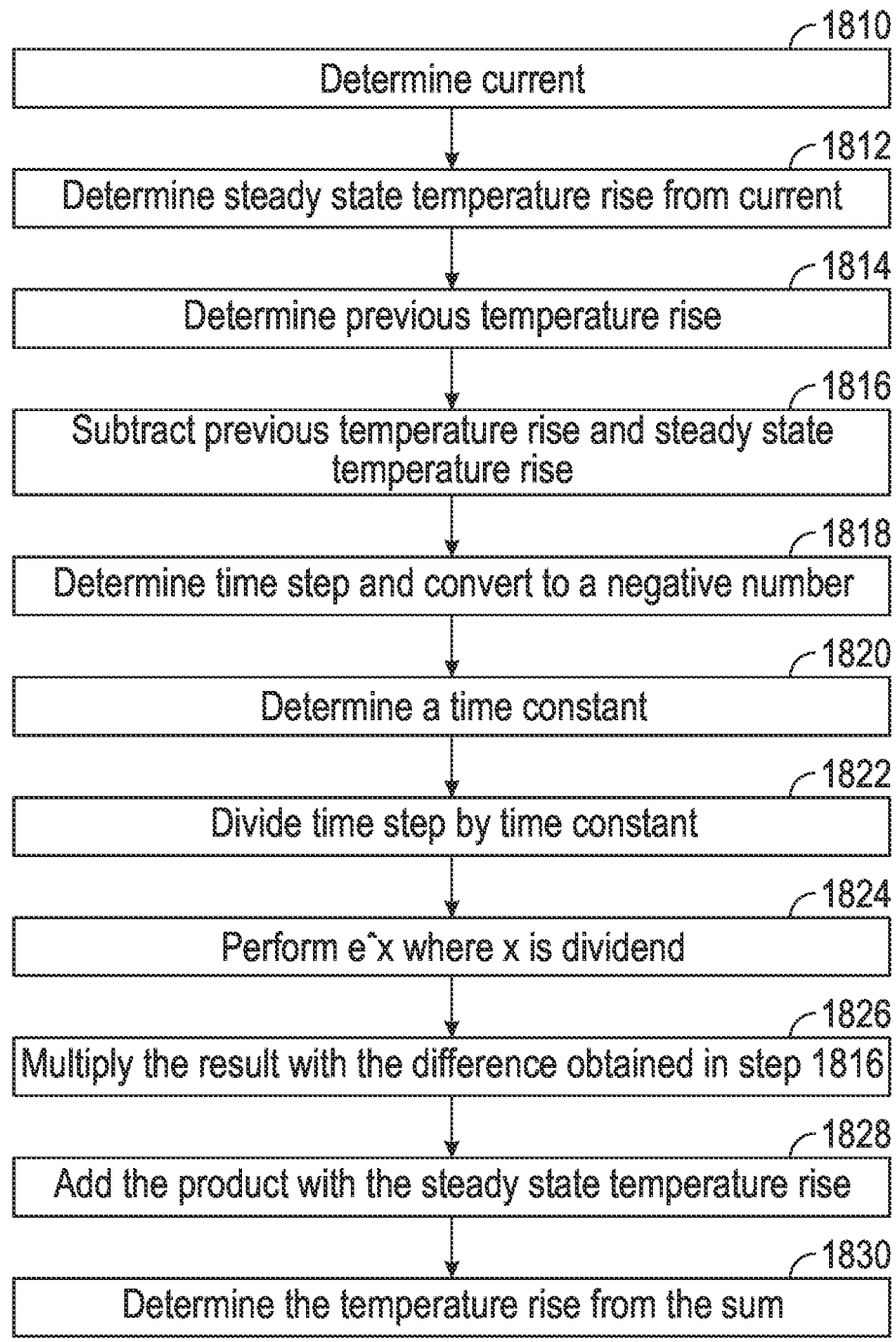
FIG. 18 is a flowchart of a thermal cable model.

Referring now to FIG. 18, a flowchart for a thermal cable model is depicted. In step 1810, a current is determined. In step 1812, a steady state temperature rise is determined from the current. In step 1814, a previous temperature rise is determined. In step 1816, the previous temperature rise is subtracted from the steady state temperature rise. In step 1818, a time step is determined and converted to a negative number. In step 1820, a time constant is determined. In step 1822, the time step is divided by the time constant. In step 1824, the dividend forms the exponent of Euler's constant. In step 1826, the result is multiplied by the difference obtained in step 1816. In step 1828, the product and steady state temperature rise are added. In step 1830, the temperature rise is determined from the sum.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Aspects of this disclosure may be implemented, in some embodiments, through a computer-executable program of instructions, such as program modules, generally referred to as software applications or application programs executed by an onboard vehicle computer or a distributed network of resident and remote computing devices. Software may include, in non-limiting examples, routines, programs, objects, components, and data structures that perform particular tasks or implement particular data types. The software may form an interface to allow a resident vehicle controller or control module or other suitable integrated circuit device to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network architectures, including multiprocessor systems, microprocessor-based or programmable-consumer electronics, minicomputers, mainframe computers, master-slave, peer-to-peer, or parallel-computation frameworks, and the like. In addition, aspects of the present disclosure may be practiced in distributed-computing environments where tasks are performed by resident and remote-processing devices that are linked through a communications network. In a distributed-computing environment, program modules or models may be located in both onboard and off-board computer-storage media including memory storage devices. Aspects of the present disclosure may therefore, be implemented in connection with various hardware, software or a combination thereof, in a computer system or other processing system.

Any of the methods described herein may include machine-readable instructions for execution by: (a) a processor, (b) a controller, and/or (c) any other suitable processing device. Any algorithm, software, control logic, protocol, or method disclosed herein may be embodied in software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, there are many other methods for implementing the example machine readable instructions that may alternatively be used.

In this application, including the definitions below, the term "module," the term "model," or the term "controller" may be replaced with the term "circuit." The term "module" or "model" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

What is claimed is:

1. A method of controlling a powertrain to protect a high voltage cable, comprising:
   determining, by one or more processors in a vehicle, a temperature characteristic for a busbar;
   determining, by the one or more processors, a temperature characteristic adjacent to a component;
   determining, by the one or more processors, a current through the high voltage cable;
   reducing, by the one or more processors, an operating characteristic of the powertrain to form a reduced operating characteristic based on the temperature characteristic for the busbar, the temperature characteristic adjacent to the component, and the current; and
   controlling, by the one or more processors, the powertrain using the reduced operating characteristic.

2. The method of claim 1, wherein determining the temperature characteristic for the busbar comprises:
   determining a busbar temperature from a temperature sensor on the busbar.

3. The method of claim 2, wherein determining the temperature characteristic for the busbar further comprises:
   determining a busbar adjusted temperature based on the busbar temperature from the temperature sensor and a nominal busbar temperature.

4. The method of claim 1, wherein determining the temperature characteristic adjacent to the component comprises:
   determining an ambient temperature; and
   determining a vehicle speed.

5. The method of claim 4, wherein determining the temperature characteristic adjacent to the component further comprises:
   determining an engine coolant temperature; and
   determining a fan speed.

6. The method of claim 5, wherein determining the engine coolant temperature comprises one or more of:
   determining a coolant temperature for a radiator; and
   determining a coolant temperature for a low temperature radiator.

7. The method of claim 1, further comprising determining a connector holder shield temperature based on the current and the temperature characteristic adjacent to the component, and wherein reducing the operating characteristic of the powertrain comprises reducing an operating characteristic of the powertrain based on the temperature characteristic for the busbar, the temperature characteristic adjacent to the component, and the current based on the connector holder shield temperature.

8. The method of claim 1, wherein determining the temperature characteristic adjacent to the component comprises determining the temperature characteristic adjacent to the one or more of:
   a high voltage cable;
   a high voltage cable connector; and
   a connector holder shield.

9. The method of claim 1, wherein reducing the operating characteristic of the powertrain comprises one of more of:
   reducing a generator power of a generator; and
   reducing an electric drive motor power of an electric drive motor.

10. The method of claim 9, further comprising determining an electric drive motor busbar temperature based on the current through the high voltage cable and a temperature characteristic adjacent to the electric drive motor, wherein reducing the operating characteristic of the powertrain comprises reducing the operating characteristic of the electric drive motor based on the electric drive motor busbar temperature.

11. The method of claim 1, wherein controlling the powertrain comprises:
   determining an exhaust surface temperature; and
   reducing the operating characteristic of the powertrain based on the temperature characteristic for the busbar, the temperature characteristic adjacent to the component, the current, and the exhaust surface temperature.

12. The method of claim 11, wherein determining the exhaust surface temperature comprises:
   determining a fan speed;
   determining a vehicle speed;
   determining a temperature characteristic adjacent to an exhaust surface; and
   determining an exhaust gas temperature.

13. A control system for controlling a powertrain to protect a high voltage cable, the control system comprising:
   one or more high voltage cables;
   one or more components comprising one or more busbars; and
   a controller configured to:
      determine a temperature characteristic for a busbar;
      determine a temperature characteristic adjacent to a component;
      determine a current through the high voltage cable; and
      reduce an operating characteristic of the powertrain based on the temperature characteristic for the busbar, the temperature characteristic adjacent to the component, and the current.

14. The control system of claim 13, wherein the controller is configured to determine a busbar temperature from a temperature sensor on the busbar.

15. The control system of claim 13, wherein the controller determines the temperature characteristic adjacent to the component by being configured to:
   determine an ambient temperature; and
   determine a vehicle speed.

16. The control system of claim 15, wherein the controller determines the temperature characteristic adjacent to the component by being configured to:
   determine an engine coolant temperature; and
   determine a fan speed.

17. The control system of claim 13, wherein the controller is further configured to:
   determine a connector holder shield temperature based on the current and the temperature characteristic adjacent to the component; and
   reduce the operating characteristic of the powertrain based on the temperature characteristic for the busbar, the temperature characteristic adjacent to the component, and the current based on the connector holder shield temperature.

18. The control system of claim 13, wherein the component is one or more of:
   a high voltage cable;
   a high voltage cable connector; and
   a connector holder shield.

19. The control system of claim 13, wherein the controller reduces the operating characteristic of the powertrain by being configured to perform one or more of:
   reduce a generator power of a generator; and
   reduce an electric drive motor power of an electric drive motor.

20. The control system of claim 13, wherein the controller controls the powertrain by being configured to:
   determine an exhaust surface temperature; and
   reduce the operating characteristic of the powertrain based on the temperature characteristic for the busbar, the temperature characteristic adjacent to the component, the current, and the exhaust surface temperature.

* * * * *